United States Patent
Jeon et al.

(10) Patent No.: US 12,040,499 B2
(45) Date of Patent: Jul. 16, 2024

(54) BATTERY MODULE

(71) Applicant: SK On Co., Ltd., Seoul (KR)

(72) Inventors: Hae Ryong Jeon, Daejeon (KR); Seok Min Kim, Daejeon (KR); Sun Mo An, Daejeon (KR); Young Sun Choi, Daejeon (KR); Eun Jeong Park, Daejeon (KR)

(73) Assignee: SK On Co., Ltd., Seoul (KR)

( * ) Notice: Subject to any disclaimer, the term of this patent is extended or adjusted under 35 U.S.C. 154(b) by 455 days.

(21) Appl. No.: 17/034,189

(22) Filed: Sep. 28, 2020

(65) Prior Publication Data

US 2021/0098760 A1   Apr. 1, 2021

(30) Foreign Application Priority Data

Sep. 30, 2019 (KR) ........................ 10-2019-0120346

(51) Int. Cl.
*H01M 50/209*  (2021.01)
*H01M 10/613*  (2014.01)
*H01M 10/6555*  (2014.01)

(52) U.S. Cl.
CPC ....... *H01M 50/209* (2021.01); *H01M 10/613* (2015.04); *H01M 10/6555* (2015.04)

(58) Field of Classification Search
CPC .. H01M 50/20; H01M 50/209; H01M 10/613; H01M 10/6555; H01M 10/647; H01M 10/6557; H01M 10/6567; H01M 10/655
See application file for complete search history.

(56) References Cited

U.S. PATENT DOCUMENTS

| | | | |
|---|---|---|---|
| 2012/0009457 A1 | 1/2012 | Lee et al. | |
| 2012/0301771 A1 | 11/2012 | Moser et al. | |
| 2015/0207187 A1* | 7/2015 | Beltz ....................... | B23P 15/26 29/890.035 |
| 2017/0069887 A1* | 3/2017 | Lee .................... | H01M 10/6555 |
| 2017/0365897 A1* | 12/2017 | Okada ................ | H01M 10/625 |
| 2018/0040932 A1* | 2/2018 | Lee ..................... | H01M 50/147 |
| 2019/0089026 A1 | 3/2019 | Choi et al. | |
| 2019/0148799 A1 | 5/2019 | Lim et al. | |
| 2019/0252741 A1* | 8/2019 | Günther ............. | H01M 10/625 |

FOREIGN PATENT DOCUMENTS

| | | | |
|---|---|---|---|
| CN | 102498610 A | 6/2012 | |
| CN | 102648549 A | 8/2012 | |
| CN | 102771004 A | 11/2012 | |
| CN | 104218272 A | 12/2014 | |
| CN | 109524583 A | 3/2019 | |
| CN | 208781901 U | 4/2019 | |
| CN | 109768192 A | 5/2019 | |
| WO | WO 2018/024483 | * 2/2018 | .......... H01M 10/625 |

OTHER PUBLICATIONS

WO 2018/024483.*

* cited by examiner

*Primary Examiner* — Kiran Quraishi Akhtar
(74) *Attorney, Agent, or Firm* — The Webb Law Firm

(57) ABSTRACT

The present invention provides a battery module including: a pair of battery groups in which a plurality of battery cells are stacked; a first heat exchanger disposed between the pair of battery groups to perform heat exchange with first stacked surfaces of the pair of battery groups; and a pair of second heat exchangers disposed outside the pair of battery groups to perform heat exchange with second stacked surfaces which are sides opposite to the first stacked surfaces.

15 Claims, 18 Drawing Sheets

BATTERY MODULE

CROSS-REFERENCE TO RELATED APPLICATION

This application claims priority to Korean Patent Application NO. 10-2019-0120346 filed Sep. 30, 2019, the disclosure of which is hereby incorporated in its entirety by reference.

BACKGROUND OF THE INVENTION

1. Field of the Invention

The present invention relates to a battery module, and more specifically, to a battery module having improved energy efficiency.

2. Description of the Related Art

Research into a rechargeable secondary battery which is generally capable of being charged and discharged, unlike a primary battery, has been actively conducted in accordance with the development of state-of-the-art fields such as a digital camera, a cellular phone, a laptop computer, a hybrid automobile and the like. An example of the secondary battery includes a nickel-cadmium battery, a nickel-metal hydride battery, a nickel-hydrogen battery, and a lithium secondary battery. Among them, the lithium secondary battery, which has operating voltage of 3.6 V or more, is used as a power supply of a portable electronic device, or is used for a high output hybrid automobile by connecting a plurality of lithium secondary batteries in series with each other. Since the lithium secondary battery has operating voltage three times higher than that of the nickel-cadmium battery or the nickel-metal hydride battery and is more excellent in view of energy density characteristics per unit weight than the nickel-cadmium battery or the nickel-metal hydride battery, the use of the lithium secondary battery has been rapidly increased.

The lithium secondary battery may be manufactured in various forms. A typical shape thereof may include cylindrical and prismatic types, which are mainly used for the lithium ion battery. In recent years, the lithium polymer battery, which has been in the spotlight, is manufactured in a pouch type having flexibility, such that the shape thereof is relatively freely implemented.

Such a pouch type lithium polymer battery (hereinafter, referred to as a "pouch type cell") may be easily bent or warped, therefore in order to use it for a long period of time, the pouch type cell should be protected by a rigid case device. However, conventionally, for such a series connection, a method of connecting electrode tabs of each pouch to a printed circuit board (PCB) on which circuit patterns are formed, and placing the cells in a case has been used.

However, according to the method of constructing a high-power battery module by stacking such conventional pouch type cells, the pouch type cell having a weak structure cannot be safely protected, and the method of stacking a plurality of pouch type cells and connecting to the PCB is not complete. Thereby, there is a disadvantage that it is not strong enough to resist environmental changes such as an external shock.

SUMMARY OF THE INVENTION

An object of the present invention is to provide a battery module having an improved assembly structure.

In addition, another object of the present invention is to provide a battery module manufactured through a simplified assembly process.

Further, another object of the present invention is to provide a battery module having improved durability.

A battery module according to an aspect of the present invention includes: a pair of battery groups in which a plurality of battery cells are stacked; a first heat exchanger disposed between the pair of battery groups to perform heat exchange with first stacked surfaces of the pair of battery groups; and a pair of second heat exchangers disposed outside the pair of battery groups to perform heat exchange with second stacked surfaces which are sides opposite to the first stacked surfaces.

The first heat exchanger and the pair of second heat exchangers may be disposed to be spaced apart from each other in parallel to each other with the pair of battery groups interposed therebetween.

The pair of battery groups may include a plurality of battery units which are disposed with being stacked, the plurality of battery units may include: a pair of battery cells among the plurality of battery cells; and a cooling plate which is interposed between the pair of battery cells, and is configured so that one end thereof is in contact with the first heat exchanger and the other end thereof is in contact with the second heat exchanger.

The pair of battery cells may be configured so that each one surface thereof is in surface contact with the cooling plate to be subjected to heat exchange therewith, and both surfaces thereof disposed on both sides of the one surface are subjected to heat exchange with the first and second heat exchangers, respectively.

The pair of battery cells may be configured to be in surface contact with the cooling plate over an entire area of the one surface thereof.

The first heat exchanger may include: a placing part into which the one end of the cooling plate is inserted, wherein the placing part is formed lengthwise in a longitudinal direction of the cooling plate, and is formed more concave than an adjacent outer surface of the first heat exchanger.

The placing part may include: an insertion face which defines a depth of an insertion space into which the cooling plate is inserted; and a pair of movement limiting faces connected to the adjacent outer surface at both ends of the insertion face, wherein the movement limiting faces are provided to limit a movement of the cooling plate inserted into the insertion space in a direction perpendicular to an insertion direction.

The plurality of battery units may include: a first battery unit, and a second battery unit stacked above the first battery unit, wherein the placing part may include: a first and a second placing parts into which the cooling plates of the first and second battery units are inserted, wherein the pair of movement limiting faces of the second placing part may have a width greater than a width formed by a pair of movement limiting faces of the first placing part.

The cooling plate may include: a plate body which is in contact with the pair of battery cells; and an expansion part which extends from the plate body and is in contact with the second heat exchanger, wherein the expansion part has a width formed to be greater than a thickness of the plate body.

The pair of second heat exchangers may include: an expansion groove which is formed to be more concave than the adjacent outer surface so as to allow the expansion part to be inserted therein.

The pair of battery groups may further include: at least one pad which is interposed between the plurality of battery units and is configured to be in contact with the other surface of the battery cell whose one surface is disposed to be in contact with the cooling plate.

The battery module may further include: an upper frame and a lower frame which are provided so as to cover the first heat exchanger, the pair of second heat exchangers and the pair of battery groups disposed so that a movement thereof is limited by the first heat exchanger and the pair of second heat exchangers.

The upper frame and the lower frame may be configured to be coupled to the first heat exchanger and the pair of second heat exchangers, thus to fix the first heat exchanger, the pair of second heat exchangers and the pair of battery groups.

The battery group may include: placing protrusions formed on a surface thereof facing the lower frame, wherein the lower frame may include: placing grooves formed therein, into which the placing protrusion is inserted to limit a movement thereof in a planar direction.

The first heat exchanger, and the pair of second heat exchangers may respectively include: inlets formed at one side thereof, through which a coolant inflows; and outlets formed the other side thereof, through which the coolant outflows, wherein the inlets and the outlets are alternately arranged in a direction in which the heat exchangers are spaced apart from each other.

In addition, a battery module according to another aspect of the present invention includes: a plurality of battery groups in which a plurality of battery cells are stacked; and a plurality of heat exchangers which are disposed to face stacked surfaces of the plurality of battery groups, and are alternately arranged with the plurality of battery groups.

The plurality of battery groups may include a pair of battery groups, wherein the plurality of heat exchangers include: a first heat exchanger disposed between the pair of battery groups; and second heat exchangers disposed outside the pair of battery groups.

Further, a battery module according to another aspect of the present invention includes: a pair of battery groups in which a plurality of battery units are stacked, wherein the plurality of battery units include a pair of battery cells, and cooling plates interposed between first surfaces facing each other of the pair of battery cells so as to be in surface contact therewith; a first heat exchanger which is disposed between the pair of battery groups and is in contact with one end of each of the cooling plates, wherein a heat generated from the first surfaces of the battery cells, and a heat generated from second surfaces of the battery cells, which extend from the first surfaces and face the first heat exchanger, are transferred to the first heat exchanger through the cooling plates; and a pair of second heat exchangers which are disposed outside the pair of battery groups and are in contact with the other end of each of the cooling plates, wherein the heat generated from the first surfaces of the battery cell, and a heat generated from third surfaces of the battery cell, which extend from the first surface and face the pair of second heat exchangers, are transferred to the pair of second heat exchangers through the cooling plates.

According to an aspect of the invention, it is possible to prevent the battery module form overheating by improving the cooling structure of the battery module.

In addition, according to another aspect of the invention, it is possible to improve the durability of the battery module by improving the assembly structure thereof.

Further, according to another aspect of the present invention, for the battery cell of the battery module, it is possible to enhance cooling efficiency for the battery cell by increasing a contact area with respect to the heat exchanger.

Further, according to another aspect of the invention, it is possible to maintain contact between the battery group and the heat exchanger by improving the coupling structure of the battery module.

Furthermore, according to another aspect of the invention, it is possible to improve an internal energy density of the battery module by improving a spatial structure thereof.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
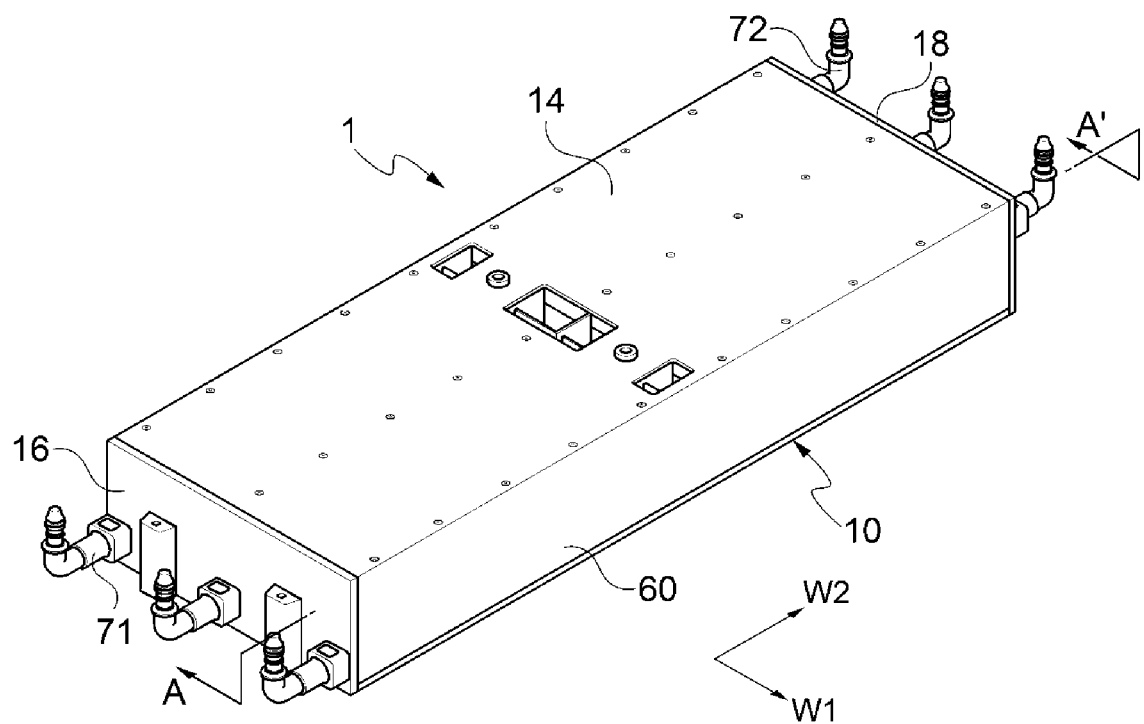
FIG. 1 is a perspective view of a battery module according to an embodiment of the present invention.

Configurations illustrated in the embodiments and drawings of the present disclosure are only preferred examples of the invention, and diverse modifications capable of replacing the embodiments and drawings of the present disclosure may be possible at a time of filing the present application.

Further, the same reference numerals or symbols in the drawings of the present disclosure will represent parts or components having substantially the same functions.

In addition, the terminology used herein is for the purpose of describing particular embodiments only and is not intended to limit the present invention thereto. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Further, the terms including numerals such as "first," "second," etc. in the present disclosure may be used to explain different components, but such components are not limited thereto. These terms are used only to distinguish one component from other components. For example, a first component may also be named a second component without departing from the scope of the present invention. Likewise, the second component may also be named the first component. The term "and/or" may include a coupling of a plurality of related items and/or any one among the plurality of related items.

In addition, the terms such as "part," "device," "block," "member," "module," and the like may refer to a unit to execute at least one function or operation. For example, the terms may refer to at least one hardware such as a field-programmable gate array (FPGA) or an application specific integrated circuit (ASIC), at least one operating process performed by at least one software stored in a memory or processor.

Hereinafter, embodiments according to the present invention will be described in detail with reference to the accompanying drawings.

Figure 2:
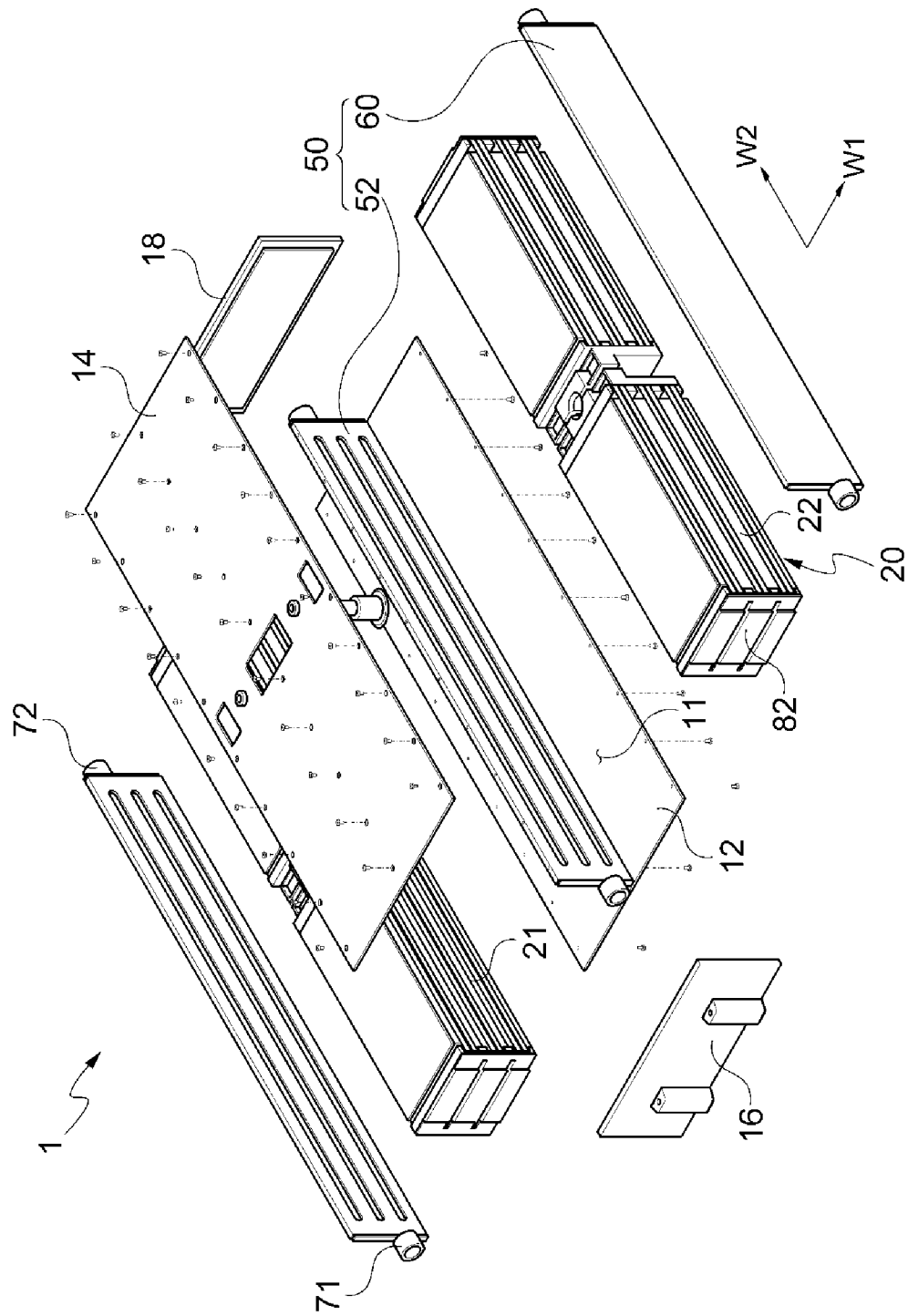
FIG. 2 is an exploded perspective view of the battery module according to the embodiment of the present invention.
Figure 3:
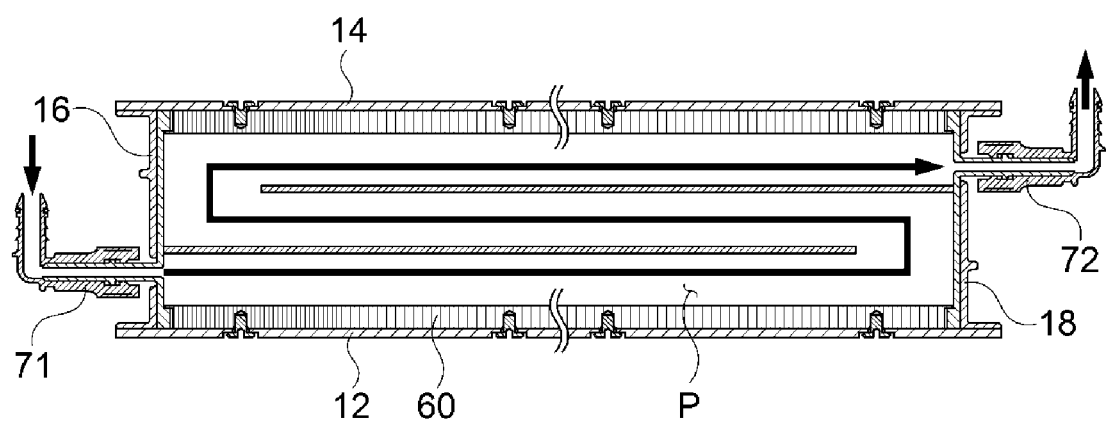
FIG. 3 is a cross-sectional view taken on line A-A' of FIG. 1.

FIG. 1 is a perspective view of a battery module according to an embodiment of the present invention, FIG. 2 is an exploded perspective view of the battery module according to the embodiment of the present invention, and FIG. 3 is a cross-sectional view taken on line A-A' of FIG. 1.

A battery module 1 according to an embodiment of the present invention may include a housing 10, a plurality of battery groups 20 provided inside the housing 10, and heat exchangers 50.

The housing 10 may include a lower frame 12, an upper frame 14 provided on a side opposite to the lower frame 12, a front frame 16 and a rear frame 18 which are disposed in front and rear of the upper frame 14 and the lower frame 12. The housing 10 may have an arrangement space 11 formed therein, in which a plurality of battery groups 20 can be disposed. A coupling relationship among the housing 10, the plurality of battery groups 20, and the heat exchangers 50 will be described in detail below.

The battery module 1 may be provided with the plurality of battery groups 20. The plurality of battery groups 20 may be disposed so as to be divided by the heat exchangers 50. In the present embodiment, the plurality of battery groups 20 are arranged in a first direction w1 which is a left-right direction with the heat exchangers 50 interposed therebetween, and are arranged in a second direction w2 which is a front-rear direction perpendicular to the first direction w1. The battery groups 20 in the second direction w2 are illustrated as being arranged two by two, but it is not limited thereto. A plurality of battery groups may be arranged in the second direction w2 depending on the required capacity of the battery as necessary. For convenience of description, the battery groups 20 arranged in the first direction w1, in which the heat exchangers 50 are interposed therebetween or arranged outside the heat exchangers 50, will be described.

The heat exchanger 50 may include a first heat exchanger 52 and a pair of second heat exchangers 60. The first heat exchanger 52 may be disposed between a pair of battery groups 20. The second heat exchangers 60 may be disposed outside the pair of battery groups 20. The first heat exchanger 52 is disposed between the pair of battery groups 20, such that first stacked surfaces 21 of the pair of battery groups 20 may be disposed so as to face each other, and the second heat exchangers 60 may face second stacked surfaces 22 which are sides opposite to the first stacked surfaces 21. With the above-described configuration, the heat exchangers 50 may be alternately arranged with the pair of battery groups 20.

In the present embodiment, the configuration, in which the first heat exchanger 52 on which the pair of battery groups 20 are disposed on both sides, and the second heat exchangers 60 disposed outside the pair of battery groups 20 are disposed, has been described. However, it is not limited thereto, and a plurality of three or more battery groups 20 are arranged in a row, and the heat exchangers 50 may also include a plurality of first heat exchangers 52 disposed between the plurality of battery groups 20, and a pair of second heat exchangers 60 disposed on outermost sides of the plurality of battery groups 20. That is, in accordance with the battery module 1 according to the present embodiment, the heat exchangers 50 and the battery groups 20 may be expanded in the first direction w1 and the second direction w2 depending on the required capacity.

The heat exchangers 50 may be configured to cover one side surface of the battery group 20. Thereby, the heat exchangers 50 may divide the battery groups 20 into sections to function as barriers of the sections, and may be configured to effectively absorb heat radiated to one side surface of the battery group 20.

The heat exchangers 50 may include an inlet 71 through which a coolant inflows, and an outlet 72 through which the coolant outflows, respectively. Specifically, each of the first heat exchanger 52 and the pair of second heat exchangers 60 may include the inlet 71 through which the coolant inflows, and the outlet 72 through which the coolant outflows. The first and second heat exchangers 52 and 60 may have a flow passage P formed therein respectively, through which the coolant inflowing from the inlet 71 flows to the outlet 72 as shown by arrows in FIG. 3.

Figure 4:
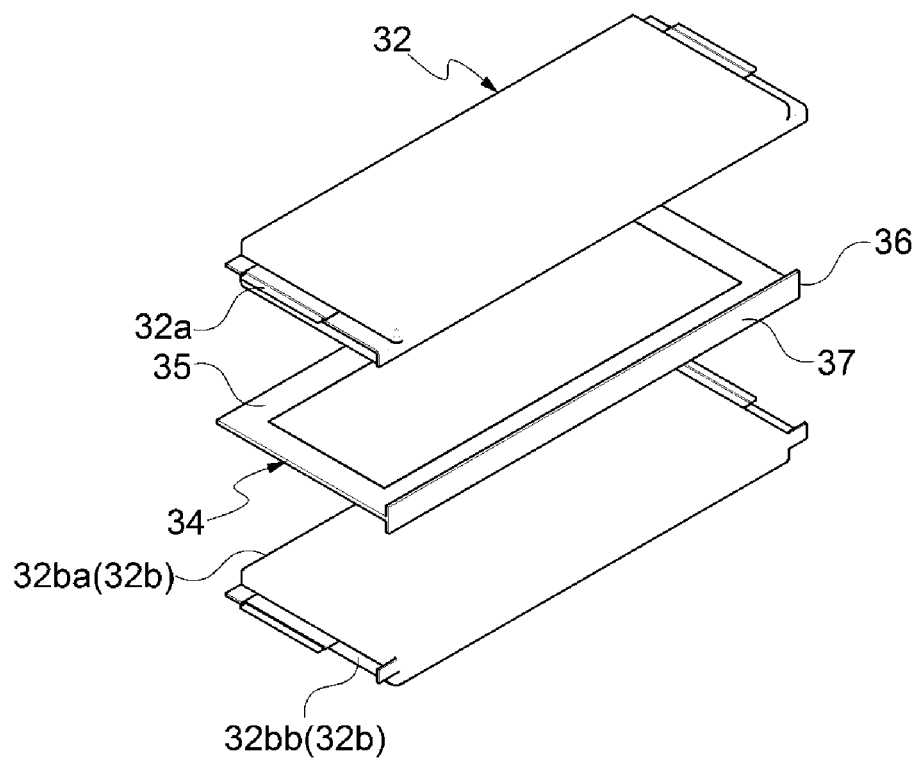
FIG. 4 is an exploded perspective view of a battery unit of the battery module according to the embodiment of the present invention.
Figure 5:
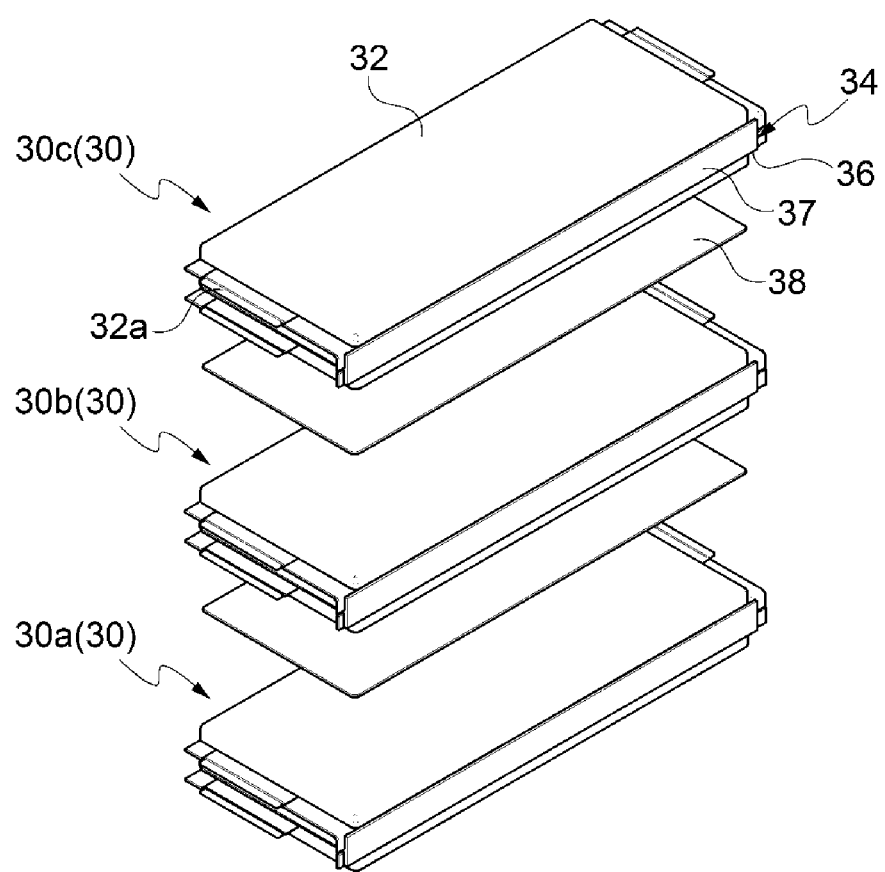
FIG. 5 is a perspective view illustrating stacking of the battery units of the battery module according to the embodiment of the present invention.
Figure 6:
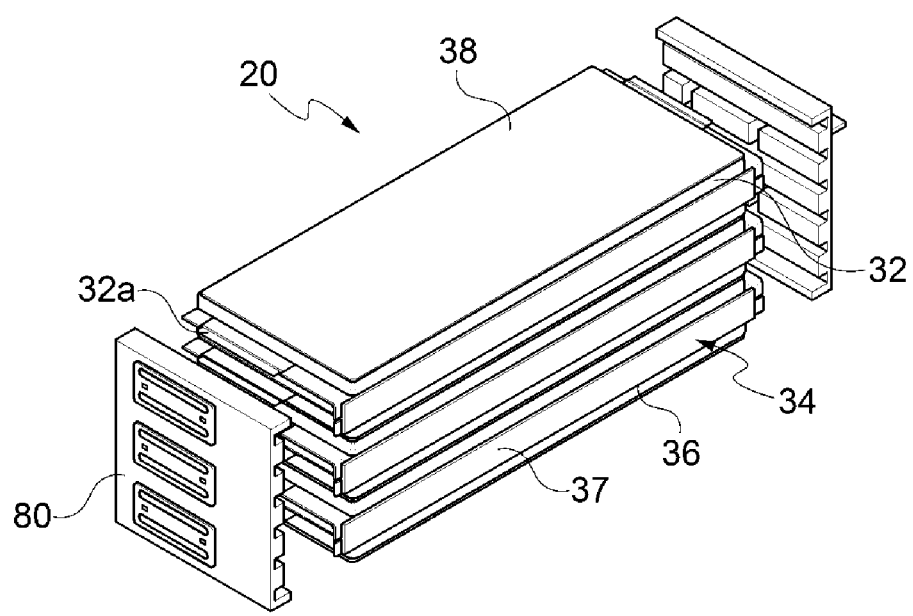
FIG. 6 is a perspective view illustrating a battery group and a bus bar of the battery module according to the embodiment of the present invention.

FIG. 4 is an exploded perspective view of a battery unit of the battery module according to the embodiment of the present invention, FIG. 5 is a perspective view illustrating stacking of the battery units of the battery module according to the embodiment of the present invention, and FIG. 6 is a perspective view illustrating a battery group and a bus bar of the battery module according to the embodiment of the present invention.

The battery group 20 may include a plurality of battery cells 32 which are disposed with being stacked, and cooling plates 34 disposed between the plurality of battery cells 32. The battery group 20 may be configured so that the plurality of battery cells 32 are stacked.

The plurality of battery cells 32 may include an electrode assembly (not shown) from which electrode tabs 32a are drawn out, and a case 32b which houses the electrode assembly, respectively. The case 32*b* may include an adhesion part 32*ba* which is in close contact with the electrode assembly, and a sealing part 32*bb* which is a portion other than the adhesion part 32*ba*, and is formed by adherence between the cases 32*b*.

The cooling plate 34 may be disposed to be interposed between the plurality of battery cells 32. The cooling plate 34 may perform heat exchange with the plurality of battery cells 32 through surface contact. The cooling plate 34 may be provided to transfer a heat generated from the plurality of battery cells 32 to the heat exchanger 50. Specifically, the cooling plate 34 may have one end contacting the first heat exchanger 52 and the other end contacting the second heat exchanger 60 to transfer the heat generated from the battery cells 32 to the heat exchanger 50. The cooling plate 34 may be configured to have a larger area than the battery cell 32 contacting therewith. That is, the battery cell 32 may be in contact with the cooling plate 34 over an entire area of the surface facing the cooling plate 34.

The battery group 20 may include a plurality of battery units 30. As described above and illustrated in FIG. 5, the battery unit 30 may include a pair of battery cells 32 among the plurality of battery cells 32 and a cooling plate 34 disposed between the pair of battery cells 32. The cooling plate 34 may be disposed so that both sides thereof are in contact with each one surface of the pair of battery cells 32. With the above-described configuration, the battery cells 32 may perform heat exchange through at least three surfaces. Specifically, one surface of the battery cell 32 may be in contact with the cooling plate 34, and both side surfaces disposed on both sides of the one surface may be in contact with the first and second heat exchangers 52 and 60 to be subjected to heat exchange therewith, respectively. Both side surfaces of the battery cell 32 may be directly in contact with the first and second heat exchangers 52 and 60 to be subjected to heat exchange therewith, respectively, or may be subjected to heat exchange through a heat transfer member (not shown). The plurality of battery units 30 may be stacked to form one battery group 20.

The battery group 20 may include at least one pad 38 (see FIG. 5). The pad 38 may be disposed between the plurality of battery units 30. The pad 38 may be disposed in such a way that one surface and the other surface thereof are in contact with the battery cells 32 between the battery units 30. With the above-described configuration, the pad 38 may prevent collisions between the battery units 30 and absorb shock applied from an outside. In addition, at least one pad 38 is disposed between the battery cells 32 to prevent or alleviate a swelling phenomenon that the battery cell 32 swells by pressing or supporting the battery cells 32. The at least one pad 38 may also be disposed between the plurality of battery units 30, and may also be interposed between the upper frame 14 and the lower frame 12 on and beneath the plurality of battery units 30.

The battery module 1 may include a bus bar 80 (see FIG. 6). The bus bar 80 may be disposed on at least one side of the battery group 20 to electrically connect the plurality of battery cells 32 forming the battery group 20 to each other. The bus bar 80 may be configured to cover a surface which does not face the heat exchangers 50 on the surface where the sealing part 32*bb* is formed among the surfaces on which the battery cells 32 are stacked. A bus bar cover 82 (see FIGS. 2 and 13) may be covered on the outside of the bus bar 80 to protect the bus bar 80. The bus bar cover 82 may be disposed between the bus bar 80 and the front and rear frames 16 and 18.

Figure 7:
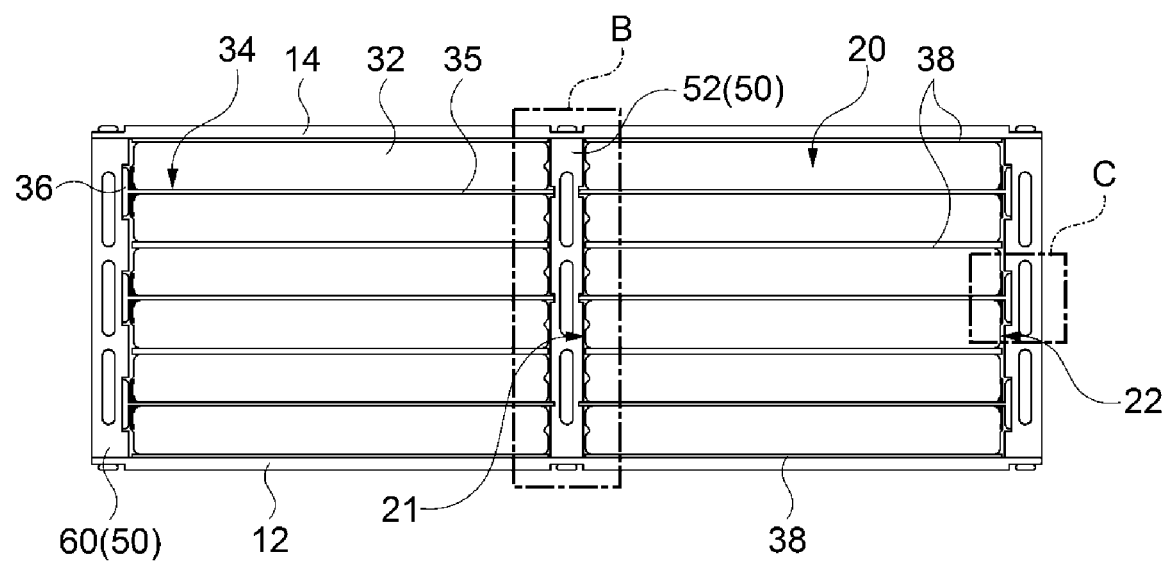
FIG. 7 is a cross-sectional view of the battery module according to the embodiment of the present invention.
Figure 8:
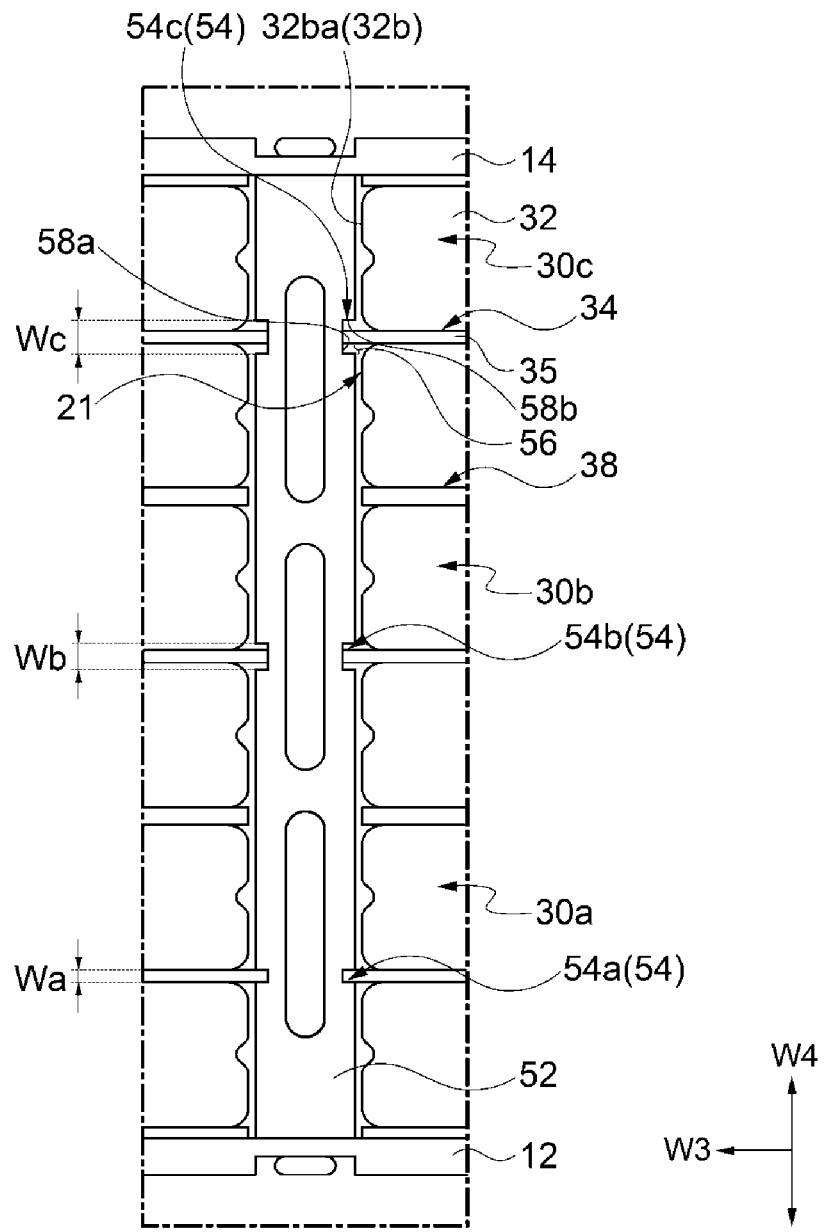
FIG. 8 is an enlarged view of a portion B in FIG. 7.

FIG. 7 is a cross-sectional view of the battery module according to the embodiment of the present invention, and FIG. 8 is an enlarged view of a portion B in FIG. 7.

The battery module 1 may include the heat exchangers 50. As described above, the heat exchangers 50 may include the first heat exchanger 52 and the pair of second heat exchangers 60. The first heat exchanger 52 and the pair of second heat exchangers 60 may be disposed to be spaced apart from each other in parallel to each other with the pair of battery groups 20 interposed therebetween.

The first heat exchanger 52 may be disposed between the pair of battery groups 20. In the pair of battery groups 20, each of the first stacked surfaces 21 facing the first heat exchanger 52 may be disposed so as to face one surface and the other surface of the first heat exchanger 52.

The second heat exchangers 60 may be disposed outside the pair of battery groups 20. In the pair of battery groups 20, each of the second stacked surfaces 22 which are sides opposite to the first stacked surfaces 21 may be disposed so as to face the second heat exchangers 60. The battery cells 32 forming a part of each of the first and second stacked surfaces 21 and 22 may also be directly in contact with the first and second heat exchangers 52 and 60 to be subjected to heat exchange therewith, or may be subjected to heat exchange through the heat transfer member (not shown).

The above-described first stacked surface 21 is a side surface of the battery group 20 formed by the adhesion parts 32*ba* of the plurality of battery cells 32, and the second stacked surface 22 is a side surface of the battery group 20 formed by the sealing parts 32*bb* of the plurality of battery cells 32. That is, the first heat exchanger 52 may face the first stacked surface 21 formed by the adhesion parts 32*ba* among the plurality of battery cells 32 of the battery group 20, and the second heat exchanger 60 may face the second stacked surface 22 formed by the sealing parts 32*bb* among the plurality of battery cells 32 of the battery group 20. With the above-described configuration, a heat radiation area of the sealing parts 32*bb* facing the second heat exchanger 60 may be smaller than a heat radiation area of the adhesion parts 32*ba* facing the first heat exchanger 52. However, in the second stacked surface 22, the heat radiation area may be compensated through the configuration of an expansion part 36 to be described below.

Figure 14:
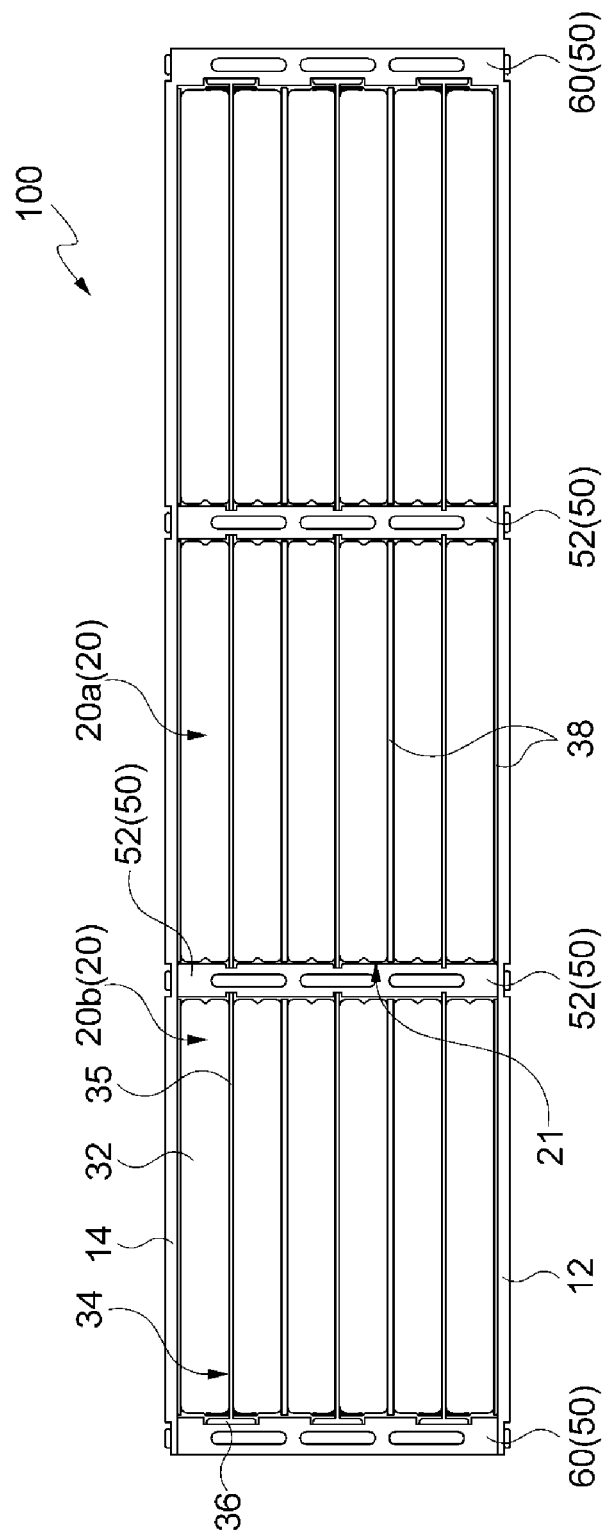
FIG. 14 is a cross-sectional view of a battery module according to another embodiment of the present invention.

The first and second stacked surfaces 21 and 22 are not limited to the adhesion parts 32*ba* and the sealing parts 32*bb* of the battery cells 32, respectively. As an example, when expanding the battery module 1, as shown in FIG. 14, when the plurality of battery groups 20 are provided and the plurality of first heat exchangers 52 are disposed therebetween, the first and second stacked surfaces 21 and 22 may any one of the adhesion parts 32*ba* and the sealing parts 32*bb* of the battery cells 32.

The first heat exchanger 52 may include placing parts 54 into which the cooling plates 34 of the pair of battery groups 20 are inserted. The placing part 54 may be formed lengthwise in the second direction w2 which is a longitudinal direction of the cooling plate 34. The placing part 54 may be formed more concave than an adjacent outer surface of the first heat exchanger 52. Since the pair of battery groups 20 are disposed symmetrically with respect to both sides of the first heat exchanger 52, the placing parts 54 may also be disposed symmetrically.

The placing part 54 may include an insertion face 58*a* and movement limiting faces 58*b*.

The insertion face 58*a* may define a depth of an insertion space 56 into which one side of the cooling plate 34 is inserted. The insertion face 58*a* may be formed to be stepped with respect to one surface and the other surface of the first heat exchanger 52, respectively. The insertion face 58a may form the insertion space 56 into which the cooling plate 34 is inserted together with the movement limiting faces 58b. The insertion face 58a may function as a stopper in an insertion direction to prevent excessive insertion of the cooling plate 34 when inserting the cooling plate 34.

The movement limiting faces 58b may be provided to limit the movement of the cooling plate 34. The movement limiting faces 58b may be connected to one surface and the other surface of the first heat exchanger 52 from both ends of the insertion face 58a. A pair of movement limiting faces 58b may be provided to prevent the cooling plate 34 inserted into the insertion space 56 from moving in a direction w4 perpendicular to an insertion direction w3.

The plurality of battery units 30 may include a first battery unit 30a and a second battery unit 30b stacked above the first battery unit 30a. In addition, the first heat exchanger 52 may include a first placing part 54a into which the cooling plate 34 of the first battery unit 30a is inserted, and a second placing part 54b into which the cooling plate 34 of the second battery unit 30b is inserted.

A pair of movement limiting faces 58b of the first placing part 54a may be formed so as to have a width Wa smaller than a width Wb of a pair of movement limiting faces 58b of the second placing part 54b. When coupling the battery group 20 with the first heat exchanger 52 through the above-described configuration, if the cooling plate 34 of the first battery unit 30a is inserted into the first placing part 54a, the cooling plate 34 of the second battery unit 30b may also be stably inserted into the second placing part 54b. Further, a pair of movement limiting faces 58b of a third placing part 54c may be formed so as to have a width Wc greater than the width Wb of the pair of movement limiting faces 58b of the second placing part 54b. In this case, the cooling plate 34 of a third battery unit 30c stacked above the second battery unit 30b may also be stably inserted into the third placing part 54c located above the second placing part 54b.

That is, when inserting the cooling plate 34 of the first battery unit 30a into the first placing part 54, since it is configured that the cooling plates 34 of the second and third battery units 30 located above the first battery unit 30a are also inserted into the second and third placing parts 54 wider than the first placing part 54, respectively, coupling the battery group 20 with the first heat exchanger 52 may be easily executed.

In addition, with the above-described configuration, when a swelling phenomenon occurs in the plurality of battery cells 32, the cooling plates 34 disposed in each battery unit 30 are supported by the movement limiting faces 58b of each placing part 54, thereby it is possible to prevent the battery cells 32 from becoming larger than a predetermined volume.

That is, the first to third placing parts 54 are arranged so that the widths Wa, Wb and Wc of the pair of movement limiting faces 58b are increased in a direction opposite to the direction of gravity. Therefore, the battery group 20 and the first heat exchanger 52 may be easily coupled with each other during manufacturing the battery module 1, and swelling of the battery group 20 may be minimized during using the same.

Figure 9:
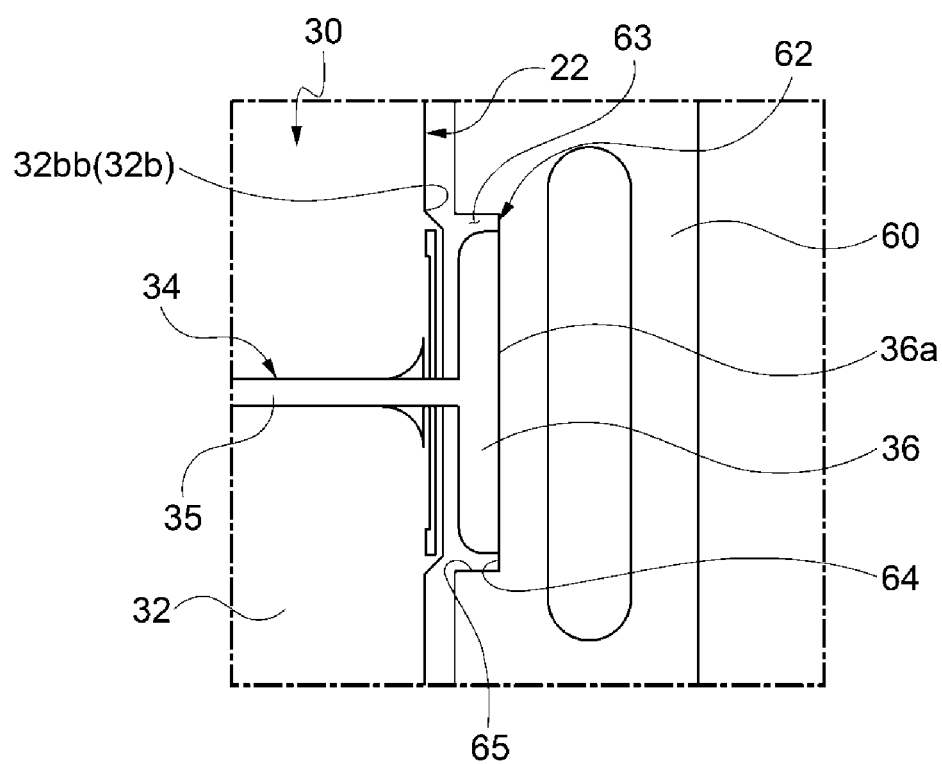
FIG. 9 is an enlarged view of a portion C in FIG. 7.

FIG. 9 is an enlarged view of a portion C in FIG. 7.

The cooling plate 34 may include a plate body 35 and an expansion part 36 extending from the plate body 35. As described above, one side of the plate body 35 may be inserted into the placing part 54, and the expansion part 36 may be disposed on the other side of the plate body 35.

The expansion part 36 may be configured so that a heat radiation surface 37 facing the other side of the cooling plate 34 has a width greater than a thickness of the plate body 35. The expansion part 36 has a body perpendicular to the plate body 35, and thus may have a larger heat radiation area than the plate body 35. To this end, the width of the heat radiation surface 37 of the expansion part 36 may be formed so as to be greater than the thickness of the plate body 35.

The pair of second heat exchangers 60 may include an expansion groove 62 which is formed to be more concave than the side surface thereof facing the second stacked surface 22 so as to allow the expansion part 36 to be inserted therein. The expansion groove 62 may form an insertion space 63 into which the expansion part 36 is inserted. The expansion groove 62 may include a groove contact face 64 that is in contact with a contact face of the expansion part 36. The groove contact face 64 is in surface contact with the heat radiation surface 37 of the expansion part 36, such that a heat from the cooling plate 34 may be quickly transferred to the second heat exchanger 60.

The expansion groove 62 may include movement limiting faces 65 connected to one surface of the second heat exchanger 60 from both ends of the groove contact face 64. The movement limiting face 65 of the expansion groove 62 may be provided to limit the movement of the cooling plate 34 similar to the movement limiting face 58b of the placing part 54. For convenience of description, the movement limiting face 58b of the placing part 54 may be referred to as a first movement limiting face 58b, and the movement limiting face 65 of the expansion groove 62 may be referred to as a second movement limiting face 65. The cooling plate 34 may be limited in the movement in the direction w3 perpendicular to the insertion direction w3 by the first and second movement limiting faces 58b and 65.

FIGS. 4, 7, and 9 illustrate a battery module has a battery group having a plurality of battery cells stacked upward. Each of the plurality of battery cells includes a lower face facing downward, an upper face facing upward, a front face facing forward and a rear face facing rearward. Each battery call also has a contact face extending from an end of the front face to an end of the rear face and a sealing face extending from another end of the front face to another end of the rear face, the sealing face positioned opposite to the contact face. Each cell also has an inner heat exchanger facing the contact face of each of the plurality of battery cells, an outer heat exchanger facing the sealing face of each of the plurality of battery cells, and a cooling plate coupled to both the inner heat exchanger and the outer hear exchanger, the cooling plate extending from the inner hear exchanger to the outer exchanger. The cooling plate includes a cooling plate body positioned between two adjacent battery cells of the plurality of battery cells and an outer end portion extended from the cooling plate body wherein the outer end portion is coupled to the outer heat exchanger. The outer end portion includes an upper part bent upward from the cooling plate body wherein the upper part covers a portion of an upper battery cell of the two adjacent battery cells. The outer end portion also includes a lower part bent downward from the cooling plate body wherein the lower part covers a portion of a lower battery cell of the two adjacent battery cells.

In the present embodiment, it has been described that the cooling plate 34 has the expansion part 36 on the other side, and the second heat exchanger 60 also has the expansion groove 62 into which the expansion part 36 is inserted. However, it is not limited thereto, and the relationship between the second heat exchanger 60 and the cooling plate 34 may be configured as the placing part 54 of the first heat exchanger 52 and the cooling plate 34. That is, the other side of the cooling plate 34 may also be configured so that the other side of the plate body 35 is inserted into the placing part 54 provided in the second heat exchanger 60 rather than the expansion part 36.

Figure 10:
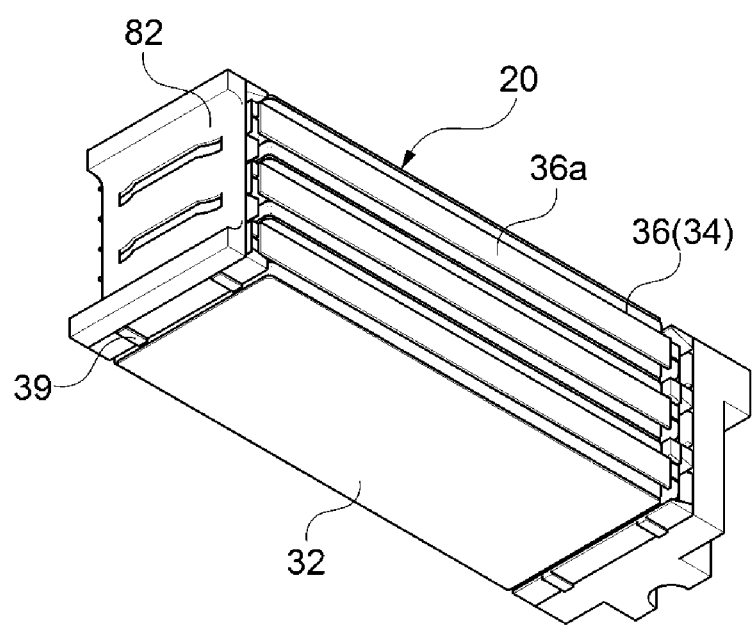
FIG. 10 is a bottom perspective view of the battery group of the battery module according to the embodiment of the present invention.
Figure 11:
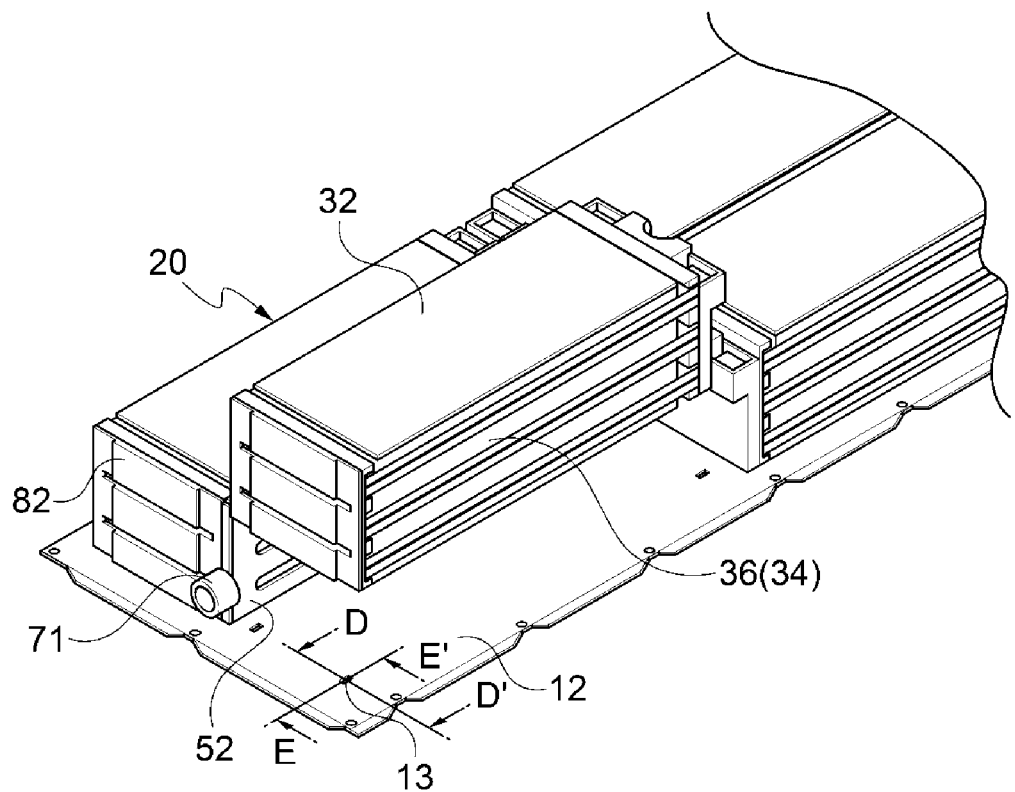
FIG. 11 is a perspective view illustrating a state in which the battery group of the battery module according to the embodiment of the present invention is mounted on a lower frame.
Figure 12:
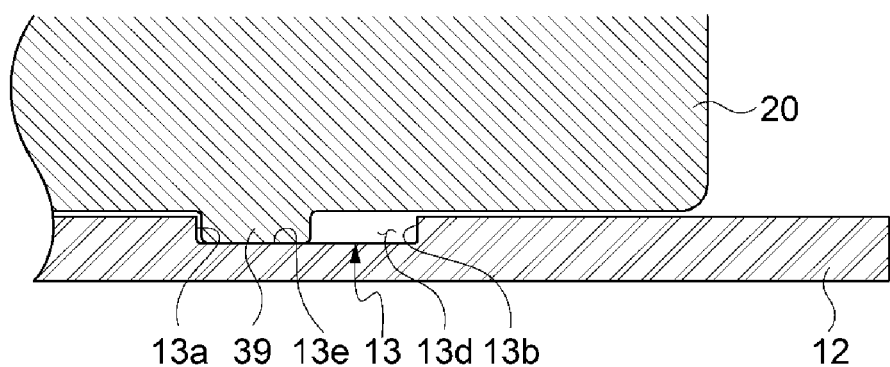
FIG. 12 is a cross-sectional view taken on line D-D' in FIG. 11, when the battery group of the battery module is mounted on the lower frame.
Figure 13:
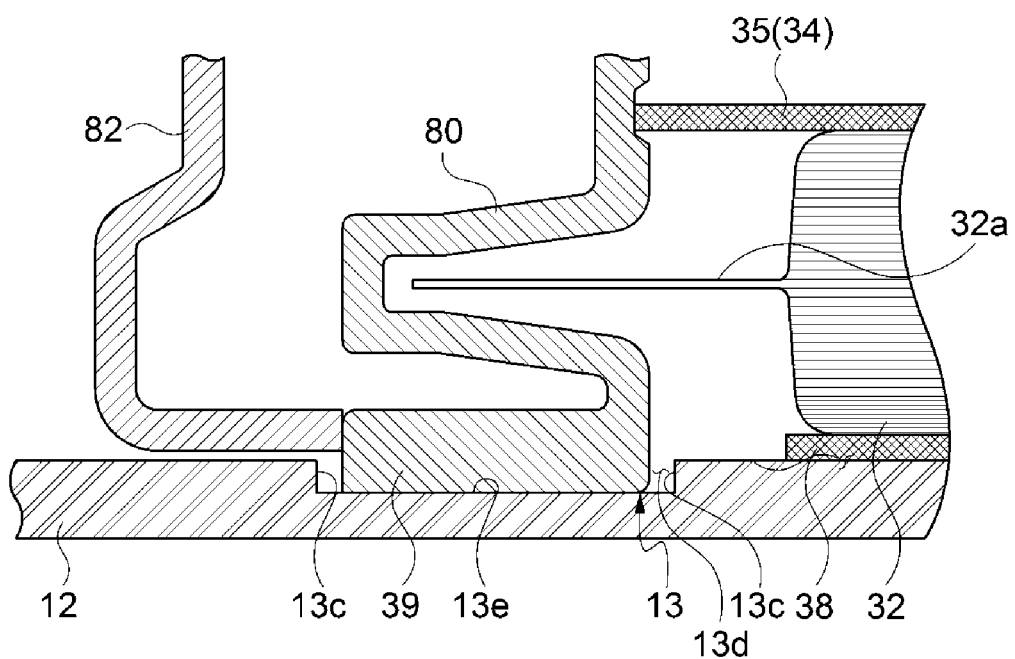
FIG. 13 is a cross-sectional view taken on line E-E' in FIG. 11, when the battery group of the battery module is mounted on the lower frame.

FIG. 10 is a bottom perspective view of the battery group of the battery module according to the embodiment of the present invention, FIG. 11 is a perspective view illustrating a state in which the battery group of the battery module according to the embodiment of the present invention is mounted on a lower frame, FIG. 12 is a cross-sectional view taken on line D-D' in FIG. 11, when the battery group of the battery module is mounted on the lower frame, and FIG. 13 is a cross-sectional view taken on line E-E' in FIG. 11, when the battery group of the battery module is mounted on the lower frame.

The battery group 20 may include placing protrusions 39 formed on a surface thereof facing the lower frame 12. The placing protrusion 39 may have a cross section formed in a rectangular shape. The placing protrusion 39 may be inserted into the placing groove 13 formed in the lower frame 12. The arrangement and the number of placing protrusions 39 are not limited. In the present embodiment, for stably supporting the battery group 20, four placing protrusions may be formed on the lower portion of the battery group 20 to be spaced apart from each other.

When the battery group 20 is placed on the lower frame 12, the placing protrusion 39 may be inserted into the placing groove 13. Since the movement of the placing protrusion 39 is limited by the placing groove 13, the battery group 20 is prevented from moving from the lower frame 12 in a planar direction. The placing groove 13 may include a first limiting face 13a adjacent to the first heat exchanger 52, a second limiting face 13b formed on a side opposite to the first limiting face 13a adjacent to the second heat exchanger 60, and a pair of third limiting faces 13c for connecting the first and second limiting faces 13a and 13b. The placing groove 13 may include a bottom face 13e defining a depth into which the placing protrusion 39 is inserted. The first to third limiting faces 13a, 13b and 13c and the bottom face 13e may form a placing space 13d in which the placing protrusions 39 are placed. As shown in FIG. 12, the movement of the placing protrusion 39 is limited by the first and second limiting faces 13a and 13b, thereby it is possible to prevent the battery group 20 from excessively moving toward the first heat exchanger 52 or the second heat exchanger 60, respectively. In addition, as shown in FIG. 13, the placing protrusion 39 is limited in the movement by the third limiting faces 13c, thereby it is possible to prevent the battery group 20 from moving in the second direction w2 which is the front-rear direction.

Hereinafter, processes of assembling the battery module of the present invention will be described. The assembly processes will be described with reference to the above-described drawings.

The plurality of battery groups 20 may be disposed with the first heat exchanger 52 interposed therebetween. The pair of battery groups 20 may be placed on the lower frame 12 by inserting the placing protrusions 39 into the placing grooves 13. The first stacked surface 21 of the pair of battery groups 20 may be disposed so as to face the first heat exchanger 52, and the pair of second heat exchangers 60 may be disposed so as to face the second stacked surface 22 of the pair of battery groups 20.

When the first and second heat exchangers 52 and 60 and the pair of battery groups 20 are placed on the lower frame 12, the upper frame 14 may cover the first and second heat exchangers 52 and 60 and the pair of battery groups 20.

The upper and lower frames 12 and 14 may be screwed with the first and second heat exchangers 52 and 60. Since the pair of battery groups 20 are coupled to the first and second heat exchangers 52 and 60 so as to be limited in the movement, internal components of the battery module 1 may be fixed through coupling of the upper and lower frames 12 and 14 with the first and second heat exchangers 52 and 60.

The front and rear frames 16 and 18 may be disposed so as to cover the battery groups 20, and may be coupled with each other during coupling the upper and lower frames 12 with respect to the heat exchangers 50.

Hereinafter, battery modules according to other embodiments of the present invention will be described. In the following description, the same configuration as the above-described configuration will not be repeatedly described.

FIG. 14 is a cross-sectional view of a battery module according to another embodiment of the present invention.

A battery module 100 may include a housing 10, a plurality of battery groups 20 provided inside the housing 10, and heat exchangers 50.

The battery module 100 may be provided with the plurality of battery groups 20. The plurality of battery groups 20 may be disposed so as to be divided by the heat exchangers 50, respectively.

The heat exchanger 50 may include a plurality of first heat exchangers 52 and a plurality of second heat exchangers 60. The plurality of first heat exchangers 52 may be disposed between the plurality of battery groups 20. The plurality of second heat exchangers 60 may be disposed on outermost sides of the plurality of battery groups 20. With the above-described configuration, the heat exchangers 50 may be alternately arranged with the plurality of battery groups 20.

In the specific configuration, the battery group 20 has a first battery group 20a whose both sides face the first heat exchangers 52, and a second battery group 20b whose one side faces the first heat exchanger 52, and the other side faces the second heat exchanger 60.

The second battery group 20b may include cooling plates 34 having the same shape as the above-described embodiment in FIGS. 1 to 13. The cooling plate 34 of the first battery group 20a may be configured so that both sides thereof can be inserted into placing parts 54 of the first heat exchanger 52, respectively. That is, the cooling plate 34 of the first battery group 20a may include a plate body 35 without the configuration corresponding to the expansion part 36.

In the present embodiment, the configuration, in which three battery groups 20a and 20b are disposed, has been described, but it is not limited thereto, and three or more battery groups may be provided. With the above-described configuration, the battery module 100 may expand the heat exchangers 50 and the battery groups 20 in the first direction w1 depending on the required capacity.

Hereinafter, a battery module according to another embodiment of the present invention will be described. In the following description, the same configuration as the above-described configuration will not be repeatedly described.

Figure 15:
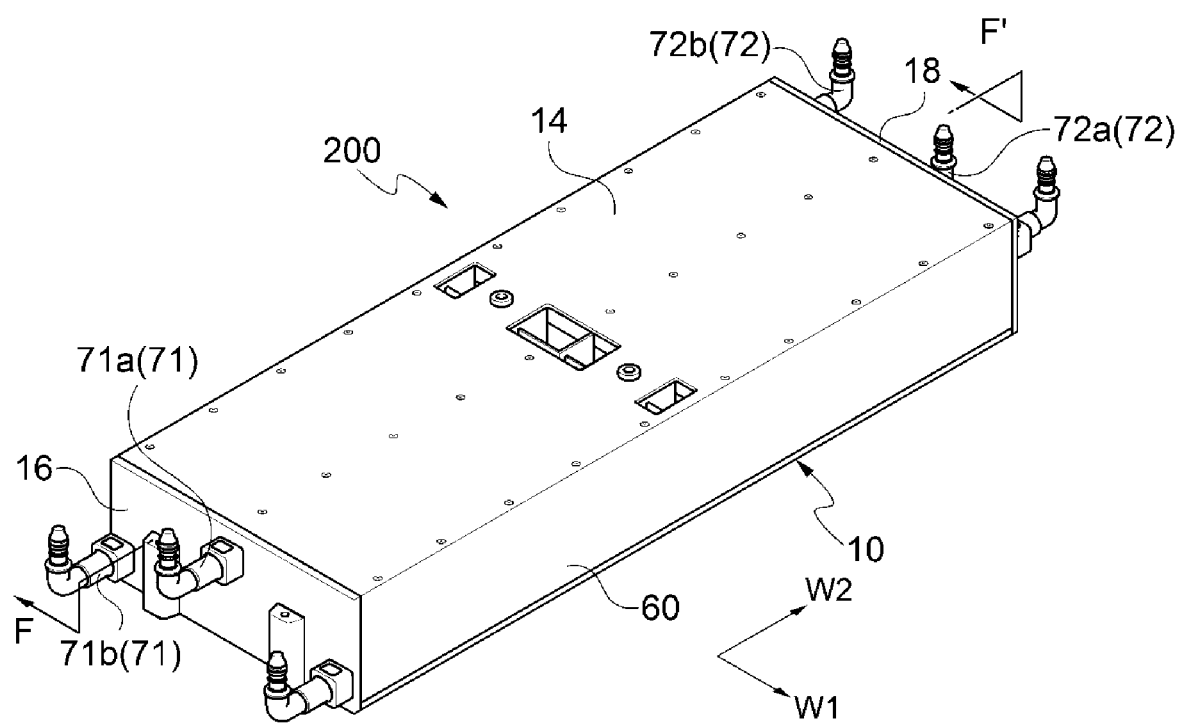
FIG. 15 is a perspective view of a battery module according to another embodiment of the present invention.
Figure 16:
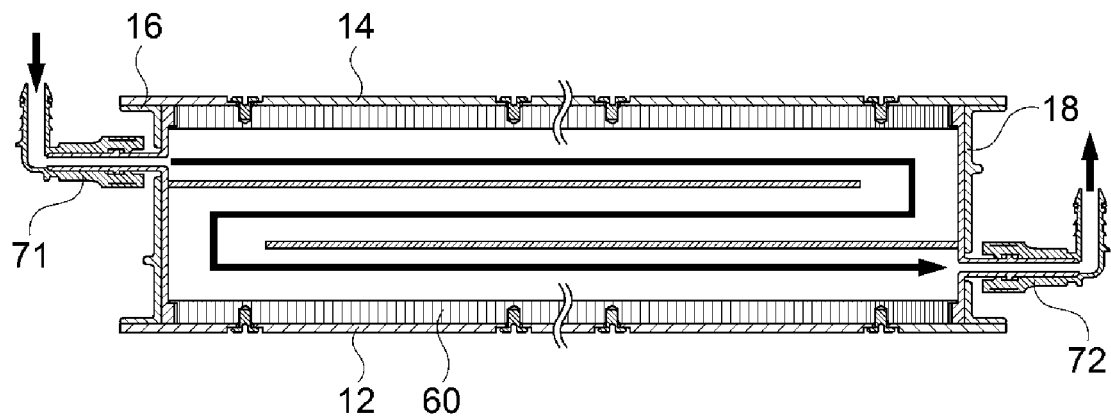
FIG. 16 is a cross-sectional view taken on line F-F' in FIG. 15.

FIG. 15 is a perspective view of a battery module according to another embodiment of the present invention, and FIG. 16 is a cross-sectional view taken on line F-F' in FIG. 15.

A battery module 200 may include a housing 10, a plurality of battery groups 20 (see FIG. 2) provided inside the housing 10, and heat exchangers 50 (see FIG. 2).

The heat exchangers 50 may include inlets 71 through which the coolant inflows, and outlets 72 through which the coolant outflows, respectively.

The inlets 71 and the outlets 72 may be alternately arranged in a direction in which the heat exchangers 50 are spaced apart from each other. For example, the heat exchangers 50 may include a second heat exchanger 60, a first heat exchanger 52 (see FIG. 2) and another second heat exchanger 60, which are disposed in this order to be spaced apart from each other in the first direction w1. In addition, an inlet 71b connected to a left second heat exchanger may be disposed at a lower portion thereof, an inlet 71a connected to the first heat exchanger 52 may be disposed at an upper portion thereof, and another inlet 71b connected to a right second heat exchanger 60 may be disposed at the lower portion. The outlet 72 may also be disposed corresponding to the inlet 71. That is, an outlet 72b connected to the left second heat exchanger 60 may be disposed at the upper portion, an outlet 72a connected to the first heat exchanger 52 may be located at the lower portion, and another outlet 72b connected to the right second heat exchanger 60 may be disposed at the upper portion. FIG. 16 is a cross-sectional view showing a flow passage through which the coolant inflowing from the first heat exchanger 52 and the inlet 71a flows to outlet 72a as shown by arrows in FIG. 15. The cross section of the flow passage through which the coolant flows through the second heat exchanger 60, the inlet 71b and the outlet 72b may refer to FIG. 3. That is, the inlets 71a and 71b and the outlets 72a and 72b may be alternately arranged in the direction in which the heat exchangers 50 are spaced apart from each other. But it is not limited thereto, and the arrangement of the inlets 71a and 71b and the outlets 72a and 72b may be adapted so that the direction in which they are alternately arranged is opposed to the above-described direction.

With the above-described configuration, the direction of the flow passage in any one heat exchanger 50 and the direction of the flow passage in the heat exchanger 50 adjacent to any one heat exchanger 50 may differ from each other. As a result, uniform heat exchange may be achieved in the battery group 20 disposed between the heat exchangers 50, and it is possible to prevent a portion thereof from being intensively overheated.

Hereinafter, a battery module according to another embodiment of the present invention will be described. In the following description, the same configuration as the above-described configuration will not be repeatedly described.

Figure 17:
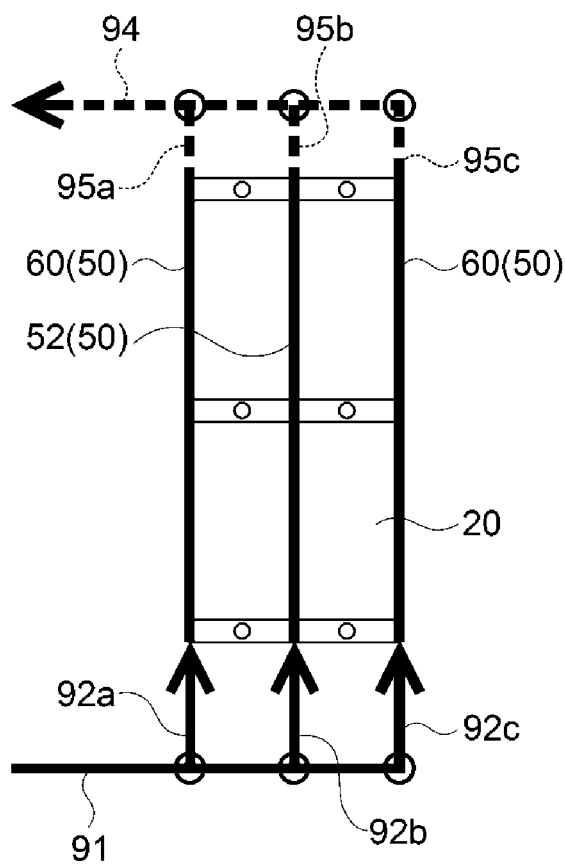
FIGS. 17 and 18 are diagrams illustrating a coolant flowing through a heat exchanger of a battery module according to another embodiment of the present invention.
Figure 18:
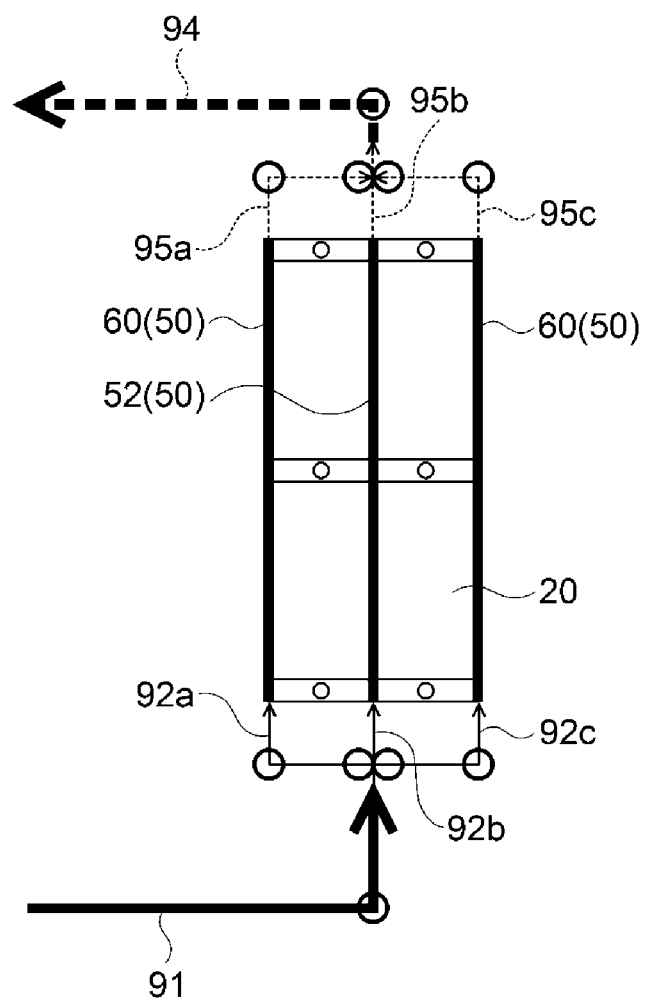

FIGS. 17 and 18 are diagrams illustrating a coolant flowing through a heat exchanger of a battery module according to another embodiment of the present invention A battery module 1 may include an inlet pipe connected to a plurality of inlets 71 to guide the coolant inflowing therein, and an outlet pipe connected to a plurality of outlets 72 to guide the coolant outflowing therefrom.

The inlet pipe may include a first main pipe 91 and first branch pipes 92a, 92b and 92c branched from the first main pipe 91 and connected to the respective inlets 71.

The outlet pipe may include second branch pipes 95a, 95b and 95c, and a second main pipe 94 to which the second branch pipes 95a, 95b and 95c are joined and connected.

Each of the branch pipes 92a, 92b, 92c, 95a, 95b, and 95c may have the same inner diameter and guide the same amount of coolant to each of the heat exchangers 50.

Alternately, depending on the capacity of the heat exchangers 50, the inner diameter of each branch pipe may differ from each other, thus to guide different amounts of coolant.

In the present embodiment, as shown in FIG. 17, the first and second branch pipes 92a, 92b, 92c, 95a, 95b and 95c may be branched from the first and second main pipes 91 and 94, respectively, and connected to the respective inlets 71 and outlets 72. However, it is not limited thereto, and as shown in FIG. 18, the first and second branch pipes 92a, 92b, 92c, 95a, 95b and 95c may be simultaneously branched from ends of the first and second main pipes 91 and 94, and connected to the respective inlets 71 and outlets 72.

Hereinafter, a battery module according to another embodiment of the present invention will be described. In the following description, the same configuration as the above-described configuration will not be repeatedly described.

Figure 19:
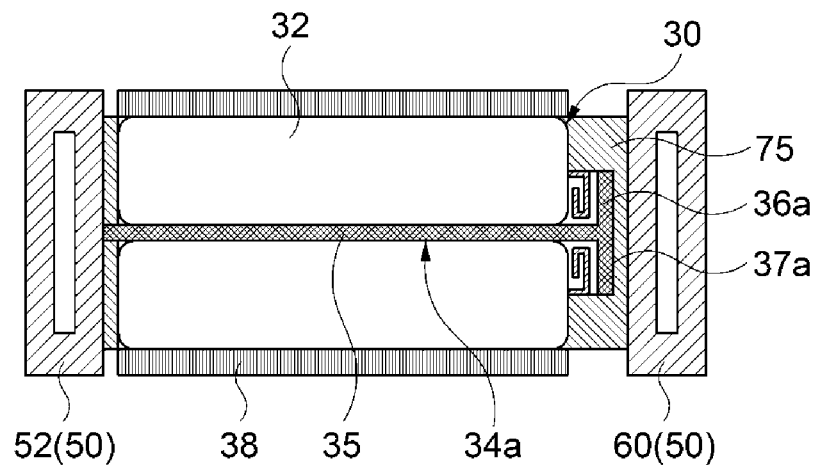
FIGS. 19 to 22 are cross-sectional views of battery units and heat exchangers of battery modules according to other embodiments of the present invention.

FIG. 19 is a cross-sectional view of a battery unit and heat exchangers of a battery module according to another embodiment of the present invention.

A cooling plate 34a may include an expansion part 36a. The expansion part 36a may be disposed to be spaced apart from a second heat exchanger 60 at a predetermined interval. That is, the expansion part 36a is not inserted into the second heat exchanger 60, and may be disposed to be spaced apart from a heat radiation surface 37a of the expansion part 36a. A battery module 1 may include a heat transfer member 75 disposed around the expansion part 36a. The heat transfer member 75 may be applied to a space between the expansion part 36 and the second heat exchanger 60 and a space between the battery cell 32 and the second heat exchanger 60. Thereby, a heat transferred from the battery cell 32 and the cooling plate 34 may be transferred to the second heat exchanger 60 through the heat transfer member 75 and the expansion part 36.

Hereinafter, a battery module according to another embodiment of the present invention will be described. In the following description, the same configuration as the above-described configuration will not be repeatedly described.

Figure 20:
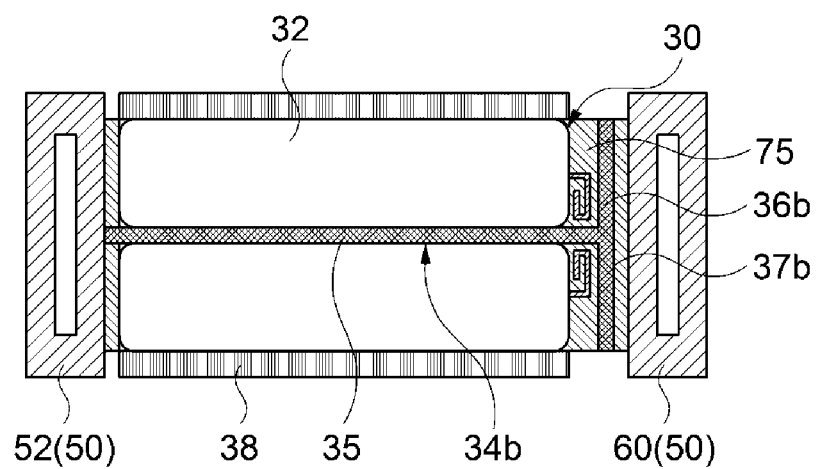
Figure 21:
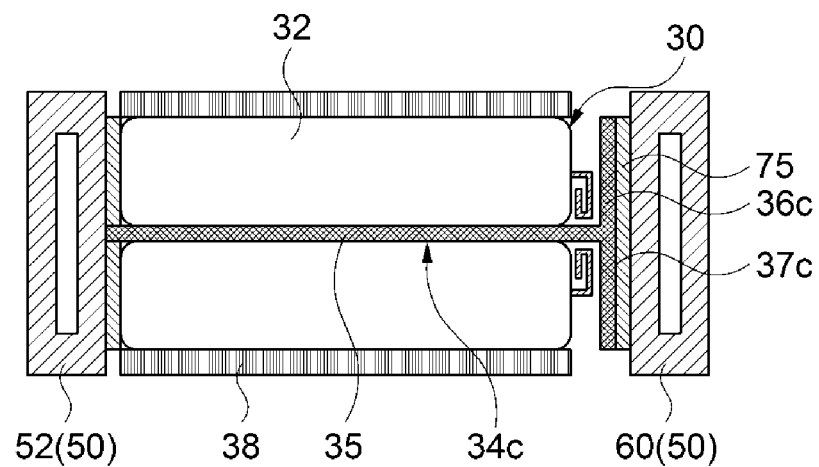

FIGS. 20 and 21 are cross-sectional views of a battery unit and a heat exchanger of a battery module according to another embodiment of the present invention, respectively.

Cooling plates 34b and 34c may include expansion parts 36b and 36c. The expansion parts 36b and 36c may be disposed to be spaced apart from second heat exchangers 60. That is, the expansion parts 36b and 36c are not inserted into the second heat exchangers 60, and may be disposed to be spaced apart from heat radiation surfaces 37b and 37c of the expansion parts 36b and 36c.

The expansion parts 36b and 36c may be formed so as to have a width equal to or greater than the width of a pair of battery cells 32 of the battery unit 30. With the above-described configuration, the heat transferred from the body of the cooling plate 34 is radiated over a larger area than that of the expansion part 36 in the embodiment 9 shown in FIG. 9, such that cooling efficiency by the second heat exchanger 60 may be enhanced.

The battery module 1 may include a heat transfer member 75 disposed around the expansion parts 36b and 36c. As shown in FIG. 20, the heat transfer member 75 may be applied to a space between the expansion part 36b and the pair of battery cells 32, and a space between the expansion part 36 and the second heat exchanger 60. However, it is not limited thereto, and as shown in FIG. 21, the heat transfer member 75 may be applied to a space between the expansion part 36c and the second heat exchanger 60.

Thereby, a heat transferred from the battery cell 32 and the cooling plate 34 may be transferred to the second heat exchanger 60 through the heat transfer member 75 and the expansion parts 36b and 36c. The battery module may also have a heat transfer member positioned between the outer end portion and the outer heat exchanger.

Hereinafter, a battery module according to another embodiment of the present invention will be described. In the following description, the same configuration as the above-described configuration will not be repeatedly described.

Figure 22:
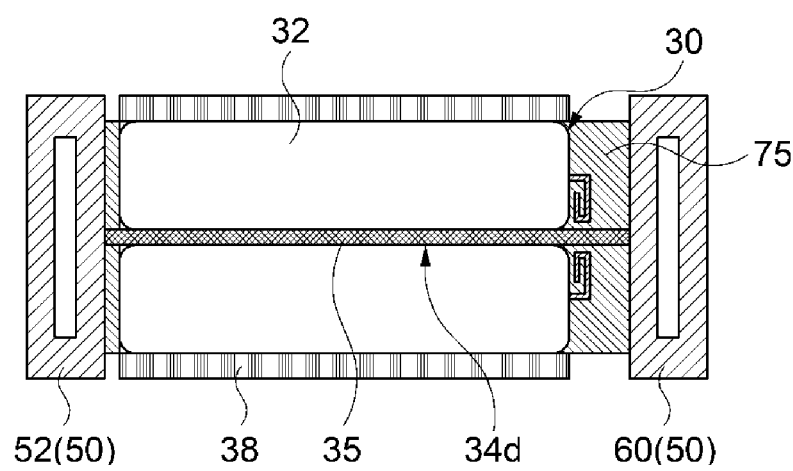

FIG. 22 is a cross-sectional view of a battery unit and a heat exchanger of a battery module according to another embodiment of the present invention.

Unlike the above-described embodiments, a cooling plate 34d may not include the configuration corresponding to the expansion part 36. That is, one side of the cooling plate 34d may be connected to a first heat exchanger 52, and the other side may be connected to the second heat exchanger 60.

A battery module 1 may include a heat transfer member 75. The heat transfer member 75 may be injected into a space between a battery cell 32 and first and second heat exchangers 52 and 60. Thereby, the heat generated from the battery cell 32 may be transferred to the first and second heat exchangers 52 and 60 through the cooling plate 34d and the heat transfer member 75.

As such, specific embodiments of the present invention have been illustrated and described in detail. However, the present invention is not limited to the above embodiments, and it will be understood by those skilled in the art that various alterations and modifications may be implemented without departing from technical spirits of the invention described in the following claims.

DESCRIPTION OF REFERENCE NUMERALS

1: Battery module
10: Housing
12: Lower frame
14: Upper frame
20: Battery group
21: First stacked surface
22: Second stacked surface
30: Battery unit
32: Battery cell
34: Cooling plate
36: Expansion part
38: Pad
50: Heat exchanger
52: First heat exchanger
54: Placing part
58a: Insertion face
58b: Movement limiting face
60: Second heat exchanger
62: Expansion groove
71: Inlet
72: Outlet
80: Bus bar

What is claimed is:

1. A battery module comprising:
a battery group having a plurality of battery cells stacked upward, each of the plurality of battery cells including:
a lower face facing downward;
an upper face facing upward;
a front face facing forward;
a rear face facing rearward;
a contact face, extending from an end of the front face to an end of the rear face; and
a sealing face, extending from another end of the front face to another end of the rear face, the sealing face positioned opposite to the contact face;
an inner heat exchanger facing the contact face of each of the plurality of battery cells;
an outer heat exchanger facing the sealing face of each of the plurality of battery cells; and
a cooling plate coupled to both the inner heat exchanger and the outer heat exchanger, the cooling plate extending from the inner heat exchanger to the outer exchanger,
wherein the cooling plate includes:
a cooling plate body positioned between two adjacent battery cells of the plurality of battery cells; and
an outer end portion extended from the cooling plate body, the outer end portion coupled to the outer heat exchanger,
wherein the outer end portion includes:
an upper part bent upward from the cooling plate body, the upper part covering a portion of an upper battery cell of the two adjacent battery cells; and
a lower part bent downward from the cooling plate body, the lower part covering a portion of a lower battery cell of the two adjacent battery cells,
wherein the outer heat exchanger includes an outer groove accommodating the outer end portion of the cooling plate, the outer groove being concave towards the cooling plate,
wherein the outer groove includes:
a groove contact face facing the upper part and the lower part of the outer end portion;
an upper movement limiting face above the upper part of the outer end portion; and
a lower movement limiting face below the lower part of the outer end portion.

2. The battery module according to claim 1, wherein the cooling plate further includes an inner end portion extended from the cooling plate body, the inner end portion coupled to the inner heat exchanger.

3. The battery module according to claim 2, wherein the lower face of the upper battery cell of the two adjacent battery cells and the upper face of the lower battery cell of the two adjacent battery cells are in contact with the cooling plate.

4. The battery module according to claim 2, wherein the inner heat exchanger comprises an inner groove accommodating the inner end portion.

5. The battery module according to claim 4, wherein the inner groove for each battery cell comprises:
an insertion face which defines a depth of an insertion space into which the cooling plate body of each cooling plate is inserted; and
a pair of movement limiting faces connected to the adjacent outer surface at both ends of the insertion face, wherein the movement limiting faces are provided to limit a movement of the cooling plate inserted into the insertion space in a direction perpendicular to an insertion direction; and wherein for the plurality of battery cells stacked upwards, the width of the movement limiting face increases sequentially from one battery cell to an adjacent battery cell.

6. The battery module according to claim 1, wherein the battery group comprises:
a plurality of battery units stacked upward; and at least one pad placed between the plurality of battery units, wherein each of the plurality of battery units includes:

the two adjacent battery cells; and the cooling plate between the pair of battery cells.

7. The battery module according to claim 1, further comprising: an upper frame and a lower frame which are provided so as to cover the inner heat exchanger, the outer heat exchanger and the battery group disposed so that a movement thereof is limited by the inner heat exchanger and the outer heat exchanger.

8. The battery module according to claim 7, wherein the upper frame and the lower frame are configured to be coupled to the inner heat exchanger and the outer heat exchanger, thus to fix the inner heat exchanger, the outer heat exchanger and the battery group.

9. The battery module according to claim 7, wherein the battery group comprises:

placing protrusions formed on a surface thereof facing the lower frame, wherein the lower frame comprises:

placing grooves formed therein, into which the placing protrusions are respectively inserted to limit a movement thereof in a planar direction.

10. The battery module according to claim 1, wherein the inner heat exchanger, and the outer heat exchanger respectively comprises:

inlets formed at one side thereof, through which a coolant inflows; and outlets formed the other side thereof, through which the coolant outflows, wherein the inlets and the outlets are alternately arranged in a direction in which the heat exchangers are spaced apart from each other.

11. The battery module of claim 1, wherein the battery group includes:

a first battery group having a first plurality of battery cells of the plurality of battery cells; and a second battery group having a second plurality of battery cells of the plurality of battery group, and wherein the outer heat exchanger includes:

a first outer heat exchanger coupled to the first battery group; and a second outer heat exchanger coupled to the second battery group.

12. The battery module of claim 1, the contact face of each of the plurality of battery cells are contact on the inner heat exchanger.

13. The battery module of claim 1, wherein each of the plurality of battery cells includes a front electrode tab protruding forward, and the battery module further comprises a front bus bar coupled to the front electrode tab of each of the plurality of battery cells.

14. The battery module of claim 13, wherein each of the plurality of battery cells includes a rear electrode tab protruding rearward, and the battery module further comprises a rear bus bar coupled to the rear electrode tab of each of the plurality of battery cells.

15. The battery module of claim 1, further comprising a heat transfer member positioned between the outer end portion and the outer heat exchanger.

* * * * *